United States Patent
Jiang et al.

(10) Patent No.: US 6,348,985 B1
(45) Date of Patent: *Feb. 19, 2002

(54) BIDIRECTIONAL WDM OPTICAL COMMUNICATION NETWORK WITH DATA BRIDGING PLURAL OPTICAL CHANNELS BETWEEN BIDIRECTIONAL OPTICAL WAVEGUIDES

(75) Inventors: Leon Li-Feng Jiang, Princeton Jct, NJ (US); Raul B. Montalvo, North Potomac, MD (US); John Lynn Shanton, III, Middletown, MD (US); Wenli Yu, Gaithersburg, MD (US)

(73) Assignee: Seneca Networks, Rockville, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/731,761

(22) Filed: Dec. 8, 2000

(51) Int. Cl.[7] ................................................ H04J 14/02
(52) U.S. Cl. ........................ 359/127; 359/119; 359/123
(58) Field of Search ................................ 359/123–124, 359/127, 130, 119, 134

(56) References Cited

U.S. PATENT DOCUMENTS

| | | | |
|---|---|---|---|
| 5,295,012 A | 3/1994 | Wilson et al. | 359/135 |
| 5,483,370 A | 1/1996 | Takahashi | 359/128 |
| 5,600,469 A | 2/1997 | Yamazaki | 359/135 |
| 5,706,111 A | 1/1998 | Morales et al. | 359/125 |
| 5,751,454 A | 5/1998 | MacDonald et al. | 359/119 |
| 5,774,245 A | 6/1998 | Baker | 359/128 |
| 5,786,917 A | 7/1998 | Maeno | 359/128 |
| 5,812,306 A * | 9/1998 | Mizrahi | 359/143 |
| 5,896,212 A | 4/1999 | Sotom et al. | 359/125 |
| 5,903,371 A | 5/1999 | Arecco et al. | 359/119 |
| 5,905,731 A | 5/1999 | Barker | 370/476 |
| 5,920,412 A | 7/1999 | Chang | 359/128 |
| 6,075,630 A | 6/2000 | Nishio | 359/110 |
| 6,078,415 A | 6/2000 | Yammamoto | 359/128 |
| 6,084,694 A | 7/2000 | Milton et al. | 359/124 |
| 6,101,012 A | 8/2000 | Danagher et al. | 359/127 |
| 6,101,013 A | 8/2000 | Monacos et al. | 359/139 |
| 6,160,660 A * | 12/2000 | Aina et al. | 359/341 |
| 6,169,616 B1 * | 1/2001 | Cao | 359/130 |
| 6,202,082 B1 * | 3/2001 | Tomizawa et al. | 709/201 |
| 6,204,943 B1 * | 3/2001 | Hamel et al. | 359/119 |

* cited by examiner

*Primary Examiner*—Leslie Pascal
(74) *Attorney, Agent, or Firm*—Margaret Burke

(57) ABSTRACT

The present invention relates to a bidirectional optical network including a bridge for selectively transferring information from an optical channel carried on a first bidirectional WDM optical waveguide to at least two optical channels on a second bidirectional WDM optical waveguide. The first and second bidirectional optical waveguides each carry two counter-propagating WDM optical signals each having plural channels. A bridge is interposed between the first and second bidirectional optical waveguides which includes an optical add-drop multiplexer optically communicating with each bidirectional waveguide. At least one optical channel having first and second data bits streams is dropped from the first bidirectional waveguide. The first and second data bit streams are respectively encoded on two different optical channels which are then added to the second bidirectional optical waveguide. Advantageously, the two optical channels encoded with the two series of data bits may travel in the same or opposite directions when added to the second bidirectional waveguide, further enhancing network flexibility.

8 Claims, 3 Drawing Sheets

FIRST WAVEGUIDE CARRYING WDM SIGNAL

SECOND WAVEGUIDE CARRYING WDM SIGNAL

BIDIRECTIONAL WDM OPTICAL COMMUNICATION NETWORK WITH DATA BRIDGING PLURAL OPTICAL CHANNELS BETWEEN BIDIRECTIONAL OPTICAL WAVEGUIDES

BACKGROUND OF THE INVENTION

1. Field of the Invention

The invention is directed to optical communication systems in general and, more particularly, to bidirectional optical networks that include two or more bidirectional waveguides each transporting counter-propagating WDM optical signals and having a data bridge for directing selected bit streams encoded on one optical channel from one bidirectional waveguide to plural channels on another bidirectional waveguide.

2. Description of the Related Art

As the need for communication signal bandwidth increases, wavelength division multiplexing (WDM) has progressively gained popularity for multiplying the transmission capacity of a single optical fiber. A review of optical networks, including WDM networks, can be found in Ramaswami et al., *Optical Networks: A Practical Perspective* (Morgan Kaufman, © 1998), the disclosure of which is incorporated herein by reference. Typically, wavelength division multiplexed optical communication systems have been designed and deployed in the long-haul, interexchange carrier realm. In these long-haul optical systems, a wavelength division multiplexed optical communication signal comprising plural optical channels at different wavelengths travels in a single direction on a single fiber (unidirectional transmission). Because the communication traffic in such systems commonly travels many hundreds of kilometers, the need for add-drop multiplexing of individual channels is infrequent (if at all), occurring at widely-spaced add-drop nodes.

Although the optical infrastructure of long-haul WDM optical systems can accommodate future traffic needs created by increased demand from traditional and multimedia Internet services, this traffic must first be collected and distributed by local networks. Currently, such local networks are predominantly structured to carry a single wavelength, time-division multiplexed (TDM) optical signal along a fiber network organized into various ring structures. To route the various components of the TDM signal, numerous electronic add-drop multiplexers are positioned along the fiber network. At each add-drop location, the entire optical signal is converted into an electrical signal; the portions of the electrical signal which are destined for that add-drop point are routed accordingly. The remaining portions of the electrical signal are converted back to a new TDM optical signal and are output through the electronic add-drop multiplexer. Thus, before a user can access the bandwidth-rich WDM long-haul transport networks, he must first pass through the bottleneck of the local networks.

Although unidirectional WDM optical systems are suitable for conventional long-haul interexchange carrier markets, metropolitan (local) communications systems require extensive routing and switching of traffic among various nodes positioned within interconnecting optical fiber rings. Consequently, smaller metropolitan markets require considerably more extensive add-drop multiplexing in order to successfully implement wavelength division multiplexing in their short-range systems. Further, in order to maximize the effectiveness of wavelength division multiplexing in these local areas, it would be useful to implement bidirectional WDM optical systems, e.g., to enhance network design flexibility. In a bidirectional WDM system counter-propagating WDM optical signals, each of which carry a number of optical channels, are carried on the same waveguiding medium, such as a single optical fiber. Implementation of a bidirectional system requires several considerations not present in the conventional unidirectional optical systems. Add-drop multiplexing in a bidirectional optical environment becomes considerably more complex since optical channels are usually selected from each of the counter-propagating WDM optical signals. In addition to the difficulties posed by add-drop multiplexing channels from two counter-propagating WDM optical signals, there must also be techniques for directing channels from one bidirectional WDM optical waveguide to another. For example, in a local metropolitan network, it would be desirable to optically transfer traffic among adjacent bidirectional rings.

In U.S. patent application Ser. No. 09/704,566 entitled "Bidirectional WDM Optical Communication Network With Optical Bridge Between Bidirectional Waveguides," assigned to the assignee of the present invention, the disclosure of which is incorporated by reference herein, a technique is proposed which permits the transfer of an optical channel from one bidirectional WDM optical system to another bidirectional WDM optical system. While this application provides a useful technique for the routing of an entire optical channel between bidirectional optical systems, it does not provide a technique for taking portions of the information encoded on an optical channel carried by one bidirectional system and dividing it among plural optical channels carried on another bidirectional optical waveguide. There is a need in the art for a data bridge which would permit such data routing from a channel carried by one bidirectional optical waveguide to plural channels carried by another bidirectional optical waveguide. Such a device would permit effective implementation of bidirectional wavelength division multiplexing in local, metropolitan markets requiring high volumes of signal re-routing and allow creation of flexible network topologies.

SUMMARY OF THE INVENTION

The present invention relates to a bidirectional optical network including a bridge for selectively transferring information from an optical channel carried on a first bidirectional wavelength division multiplexed optical waveguide to at least two optical channels on a second bidirectional wavelength division multiplexed optical waveguide. The network includes a first bidirectional optical waveguide carrying a first bidirectional WDM optical communication signal which includes a first WDM signal having plural first optical channels propagating in a first direction and a counter-propagating second WDM signal including plural second optical channels.

The network also includes a second bidirectional optical waveguide carrying a second bidirectional WDM signal which includes a third WDM signal composed of third optical channels and a counter-propagating fourth WDM signal having plural fourth optical channels.

A bridge is interposed between the first and second bidirectional optical waveguides. The bridge includes a first optical add-drop multiplexer optically communicating with the first bidirectional waveguide which selects at least one optical channel from the first WDM signal. The first optical channel carries a first series of data bits and a second series of data bits encoded on the optical channel.

The bridge also includes a first optical network interface which includes an optical to electrical conversion element for converting the selected first optical channel to a first electrical signal which includes the first and second series of data bits. The optical network interface separates the first series of data bits from the second series of data bits and encodes a second electrical signal with the first series of data bits and encodes a third electrical signal with the second series of data bits. Alternatively, the first and second series of data bits could have been placed on separate electrical signals by the optical to electrical conversion element.

The electrical signals respectively encoded with the first and second series of data bits electrically communicate with a second optical network interface. The second optical network interface includes at least two electrical to optical conversion elements such that the second electrical signal encoded with the first series of data bits is used to modulate a second optical channel and the third electrical signal encoded with the second series of data bits is used to modulate a third optical channel. These optical channels are sent to a second optical add-drop multiplexer optically communicating with the second bidirectional optical waveguide where they are added to the counter-propagating WDM optical signals on the second bidirectional waveguide. An advantageous feature of the present invention is that the two optical channels encoded with the two series of data bits may travel in the same or opposite directions when added to the second bidirectional waveguide, further enhancing network flexibility.

DETAILED DESCRIPTION

Figure 1:
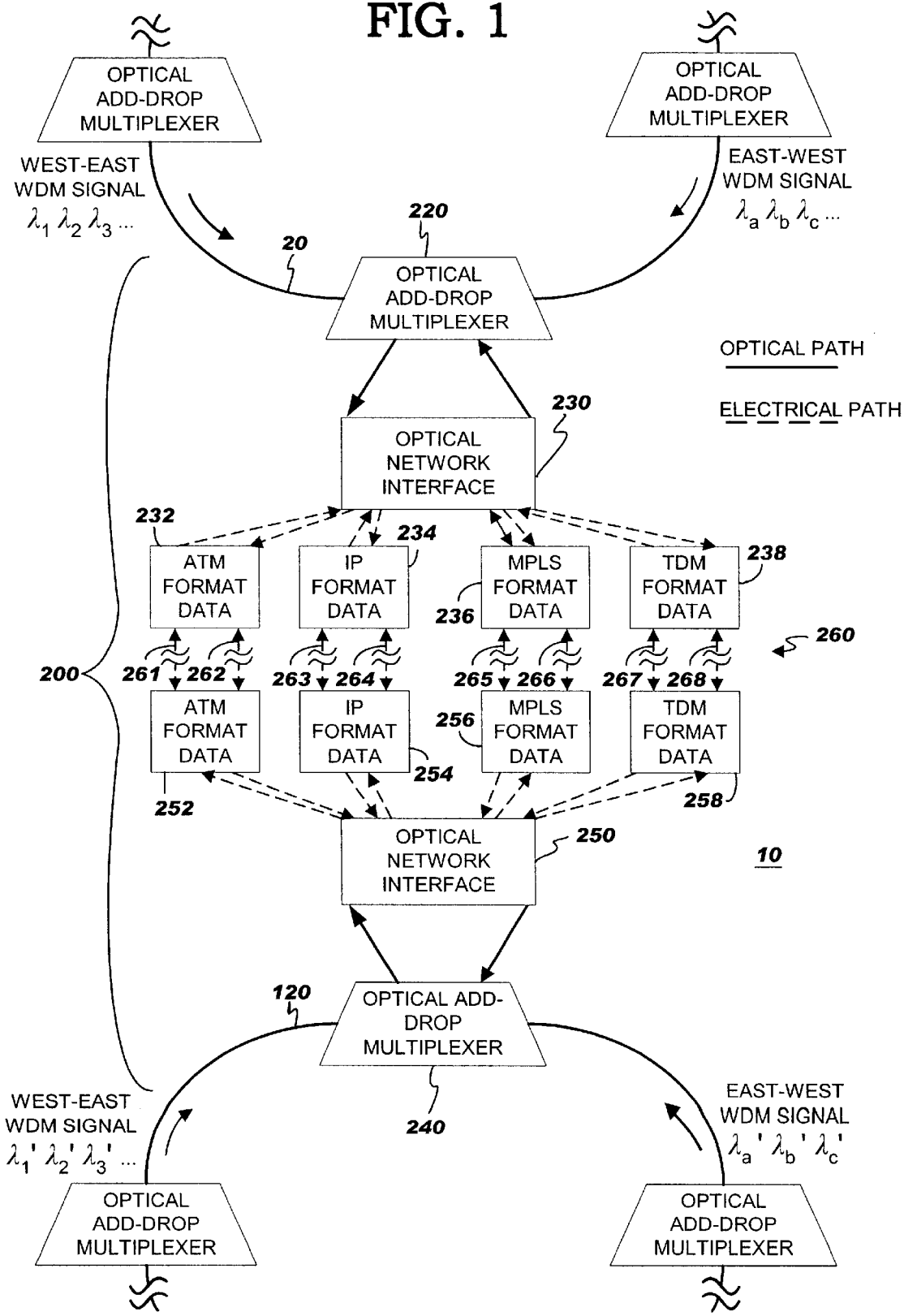
FIG. 1 schematically depicts two bidirectional WDM optical communication waveguides having a data bridge therebetween.

Turning now to the drawings in detail in which like numerals indicate the same or similar elements, FIG. 1 depicts a bidirectional wavelength division multiplexed optical communication network 10 according to a first embodiment of the present invention. Optical network 10 includes bidirectional waveguides 20 and 120 and a bridge 200. Each bidirectional optical transmission waveguide 20, 120 is configured to carry two counter-propagating wavelength division multiplexed optical communication signals, each WDM signal comprised of plural optical channels at different wavelengths. In accordance with traditional industry nomenclature, one of the WDM signals propagating in a first direction is designated the west-east WDM signal while the WDM signal propagating in the opposite direction is designated the east-west WDM signal. The individual optical channels in the west-east WDM optical signal are denoted by the symbols $\lambda_1$, $\lambda_2$, $\lambda_3$ etc., while the individual optical channels in the east-west WDM optical signal are denoted by the symbols $\lambda_a$, $\lambda_b$, $\lambda_c$, etc. for clarity of presentation. For the bidirectional WDM optical signal carried on waveguide 120, the individual optical channels in the west-east WDM optical signal are denoted by the symbols $\lambda_{1'}$, $\lambda_{2'}$, $\lambda_{3'}$ etc., while the individual optical channels in the east-west WDM optical signal are denoted by the symbols $\lambda_{a'}$, $\lambda_{b'}$, $\lambda_{c'}$, etc. Although not shown in FIG. 1, it is common for optical networks to include at least two alternate optical paths- a "work" path and a "protect" path. Only one path is depicted in FIG. 1 although it is understood that at least an additional path may be provided along each bidirectional waveguide. Each of the bidirectional optical waveguides can form part of an optical ring network or other network topologies such as mesh networks, point-to-point networks, subtended ring networks, or any other network topology which can include at least two bidirectional waveguides.

As used herein, the expression "wavelength division multiplexed" or "WDM" refers to any optical system or signal composed of plural optical channels having different wavelengths, regardless of the number of channels in the system or signal. As such, the term "wavelength division multiplexing" or "WDM" encompasses all categories of WDM such as DWDM (dense wavelength division multiplexing) and CWDM (coarse wavelength division multiplexing).

Optical add-drop multiplexer 220 is interposed along waveguide 20 to optically communicate with the waveguide for receiving a wavelength division multiplexed optical signal. As used herein, the expression "optically communicates" designates an optical path between two elements. The optical path may be a direct path or it may route through intermediate optical devices (e.g., optical isolators, additional optical circulators, filters, amplifiers, etc.). Optical add-drop multiplexer 220 may be selected from a number of devices depending upon the overall configuration of optical network 10. Considerations include the number of optical channels in the system, whether it is desired to drop a fixed number of channels of fixed wavelengths at the same drop point (or, conversely, a variable number of channels of different wavelengths), etc. In the simplest case, optical add-drop multiplexer 220 is configured to drop or add a single optical channel of a fixed wavelength, as schematically indicated in the exemplary embodiment of FIG. 1. Various configurations for optical add-drop multiplexers are depicted in *Optical Networks: A Practical Perspective*, incorporated by reference above. In an exemplary embodiment, optical add-drop multiplexers 220 and 240 are bidirectional optical add-drop multiplexers of the type disclosed in assignee's copending U.S. patent application Ser. No. 09/677,764, filed Oct. 3, 2000, the disclosure of which is incorporated by reference herein.

Figure 2:
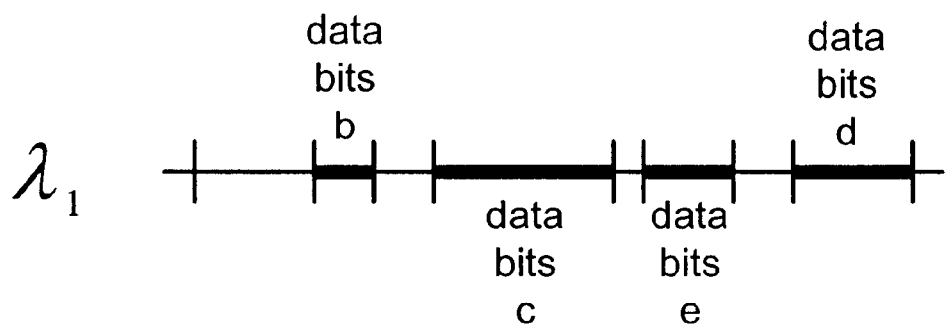
FIG. 2 schematically illustrates various series of data bits encoded on a first optical channel on a first bidirectional waveguide used to encode two different optical channels on a second bidirectional waveguide.
Figure 2:
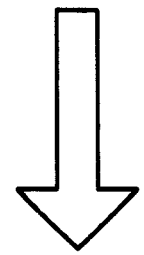
Figure 2:
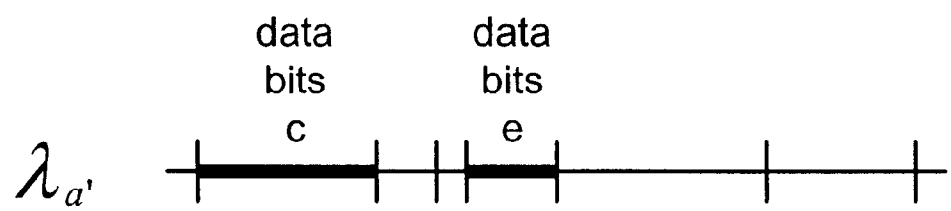
Figure 2:
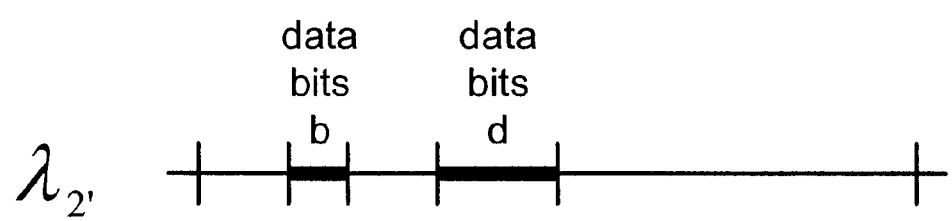

A channel dropped from either the west-east or east-west WDM optical signal is routed to an optical network interface 230. In an exemplary embodiment, the west-east optical channel designated $\lambda_1$ carried on bidirectional waveguide 20 is dropped by optical add-drop multiplexer 220. As seen from the schematic depiction of this optical channel shown in FIG. 2, $\lambda_1$, is encoded with various data bit streams, labeled "data bits b," "data bits c," "data bits d," and "data bits e." The term "data," as used herein, broadly represents any type of information to be transmitted over an optical communication system including, but not limited to, voice, images, video, music, text, etc. Each of the data bit streams can be formatted in a variety of "data formats" which may be the same or different. As defined in *Telecommunication Transmission Systems*, (Robert Winch, second edition, McGraw-Hill, N.Y. ©1998), the disclosure of which is incorporated by reference herein, a protocol is "a set of rules that control a sequence of events which take place between equipment or layers on the same level." ATM (Asynchronous Transfer Mode), IP (Internet Protocol), MPLS (MultiProtocol Label Switching), TDM (Time Division Multiplexing) are all examples of protocols used to carry data over optical networks. Within these protocols are various data formats which define how the individual bits of information are grouped in a signal (e.g., header bits, payload bits, identifier bits, routing information bits, Thus, for each protocol (e.g., ATM, IP, MPLS, TDM, etc.) there is an associated data format for that protocol. In the context of the present invention, the use of the terms ATM, IP, MPLS, TDM, etc. refer to the data format associated with that protocol unless otherwise indicated. Further discussion of techniques for encoding optical channels with different data formats is described in applicants' copending U.S. patent application Ser. No. 09/688,804, the disclosure of which is incorporated by reference herein.

The information placed on optical channel $\lambda_1$ includes data configured in any of the data formats set forth above; in an exemplary embodiment the optical system is constructed so that plural data formats can be simultaneously and independently placed on a single optical channel without conversion to another data format prior to placement on that channel. However, it is understood that bridge 200 may just as readily be implemented with data of a single format or data of multiple formats which have been converted to a single format.

Optionally, when data of multiple formats is encoded on the channel $\lambda_1$ optical network interface 230 electrically communicates with plural data receivers each of which is configured to receive and/or transmit a different data format—ATM formatted data receiver 232, IP formatted data receiver 234, MPLS formatted data receiver 236, and TDM formatted data receiver 238. The optical network interface intelligently groups the bit streams from $\lambda_1$ and distributes the bitstreams according to their format to the appropriate device.

To route the data bits encoded on $\lambda_1$, carried by first bidirectional waveguide 20 to the second bidirectional waveguide 120, devices 232, 234, 236, and 238 electrically communicate with counterpart devices 252, 254, 256, and 258. As used herein, the expression "electrically communicates" denotes an electrical path between the devices regardless of the presence or absence of additional electrical devices positioned therebetween. Although two sets of data transmitters/receivers are shown in FIG. 1, it is understood that a single set of data transmitters/receivers could be employed, positioned between the first optical network interface 230 and the second optical network interface 250. Further, particularly when data of a single format is employed for all of the data bits, the system may be condensed into a single optical network interface positioned between optical add-drop multiplexers 220 and 240. The single optical network interface would include at least one optical to electrical conversion element and at least two electrical to optical conversion elements; in this manner data bits encoded on the first optical channel could be separated and placed onto two optical channels using only one optical network interface.

Data bit streams b, c, d, and e are routed to optical network interface 250. Optical network interface 250 includes at least two electrical to optical conversion elements for creating two optical channels designated and $\lambda_{a'}$ and $\lambda_{2'}$ in an exemplary embodiment. Optical network interface 250 encodes $\lambda_{a'}$ with data bit streams c and e and encodes $\lambda_{2'}$ with data bit streams b and d. The data bit streams may be encoded on the optical channels through a wide variety of modulation techniques, including direct modulation techniques (e.g., varying a current source to a laser) or external modulation techniques (e.g., through Mach-Zehnder modulators, electroabsorption modulators, etc.). The technique for modulating the optical signal is not critical; therefore any technique capable of encoding data onto an optical channel is contemplated for use in the present invention. Optical channels $\lambda_{a'}$ and $\lambda_{2'}$ are routed to optical add-drop multiplexer 240 where they are added to the optical channels carried by bidirectional waveguide 120. In this example, the divided data bit streams are used to encode two counter-propagating optical channels; as stated above, the data bit streams could also be used to encode optical channels traveling in the same direction. The determination of which channels to encode with which data bit streams is dependent upon the final destination of the information; the optical network interface determines the destination of the data and then decides which optical channel should carry that data.

When the optical channel is selected in accordance with SONET standards, the data bit streams are placed into a SONET-compatible slot on the optical channel. Alternatively, other types of optical channels may be selected such as those which use the digital wrapper standard; however, it is understood that the invention may be used with any technique for multiplexing data onto an optical channel. Optical network interfaces 230 and 250 may each comprise a single apparatus or, optionally, plural apparatus which perform the functions described above. Further, as discussed above, when data of a single format is used, a single optical network interface may mutually serve bidirectional waveguides 20 and 120, eliminating intermediate devices 232, 234, 236, 238, 252, 254, 256, and 258. In yet a further embodiment, two optical network interfaces 230 and 250 may electrically communicate with each other without intermediate devices 232, 234, 236, 238, 252, 254, 256, and 258. Again, such a system may be preferred when data having a single format is used in the bidirectional WDM network.

As indicated in FIG. 1, the same process for routing data bit streams may occur for one or more optical channels dropped from bidirectional waveguide 120. In an exemplary embodiment, the same number of channels having the same wavelengths are add/dropped from each of the optical waveguides. Data bit streams from each of the channels that are dropped from each waveguide are encoded onto various optical channels being added to the other bidirectional waveguide. Alternatively, an unequal number of optical channels may be add/dropped onto each waveguide.

Figure 3:
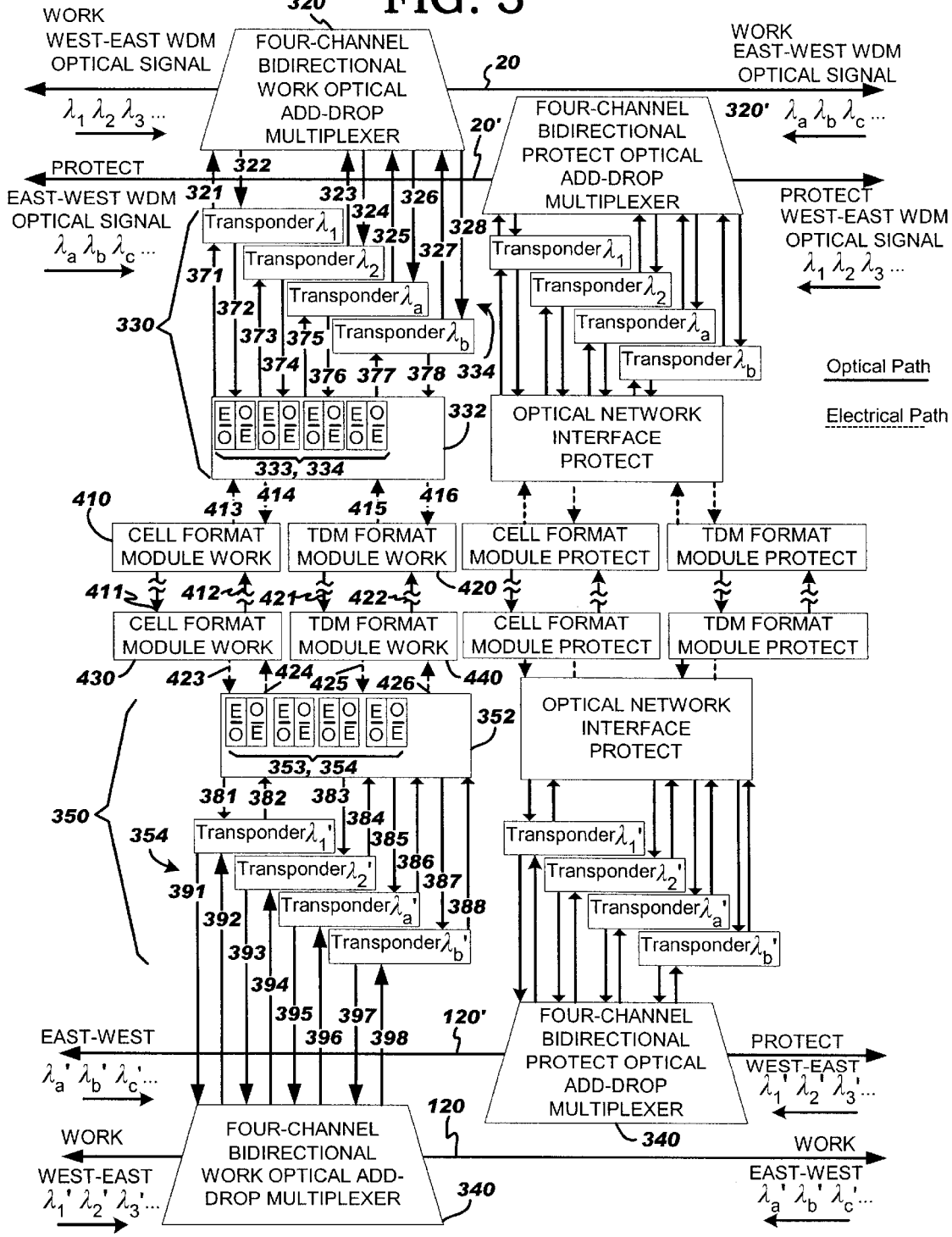
FIG. 3 depicts a further embodiment of the data bridge of the present invention employing a series of transponders as well as cell format and TDM format modules.

Turning to FIG. 3, a further embodiment of the data bridge of the present invention is depicted. In the embodiment of FIG. 3, the optical network interface systems 330 and 350 include two subsystems: optical network interfaces 332 and 352 and transponder arrays 334 and 354, respectively. Four channel bidirectional add-drop multiplexers 320 and 340 are interposed along bidirectional optical waveguides 20 and 120; these four-channel bidirectional optical add-drop multiplexers are disclosed in applicants' earlier-filed patent application, incorporated by reference above. It is noted that both a "work" and "protect" system are depicted in FIG. 3; because these systems are substantially similar, only the "work" system is described in this section.

Transponder arrays 334 and 354 both receive the optical channels dropped by add-drop multiplexers 320 and 340 and produce the optical channels to be added by the add-drop multiplexers via optical paths 321, 322, 323, 324, 325, 326, 327, 328 and 391, 392, 393, 394, 395, 396, 397, and 398. Transponder arrays 334 and 354 include short-reach optical interfaces and interact with the optical network interfaces 332 and 352 through these short-reach optical signals which are carried by optical paths 371, 372, 373, 374, 375, 376, 377, 378 and 381, 382, 383, 384, 385, 386, 387, 388, respectively.

As in the embodiment depicted in FIG. 1, optical network interfaces 332 and 352 convert information encoded on the optical channels to electrical signals as seen by the optical to electrical conversion elements 333, 353 in FIG. 3; in the embodiment depicted in FIG. 3, electrical signals are formed from two optical channels selected from each direction from both optical waveguides 20 and 120. These selected optical channels are designated $\lambda_1$, $\lambda_2$, $\lambda_a$, $\lambda_b$, from waveguide 20 and $\lambda_{1'}$, $\lambda_{2'}$, $\lambda_{a'}$, $\lambda_{b'}$ from waveguide 120. When each optical channel carries information having different data formats, the optical network interfaces 332 and 352 can communicate with cell format modules 410, 430 and TDM format modules 420, 440 are provided so that data having cell or TDM formats can be received from the optical network interfaces and be intelligently routed to optical channels created by electrical to optical conversion elements 334, 354. Although single cell format modules 410, 430 and TDM format modules 420, 440 are depicted in FIG. 3, a pair of cell format and TDM modules would typically be associated with each of the four optical channels being add-dropped by each optical add-drop multiplexer 320, 340; the remaining modules have been omitted for clarity of presentation. However, depending upon the particular implementation of the system, individual modules could be used to deal with the cell format or TDM format portions of each of the four optical channels add-dropped on each bidirectional waveguide. Routing the respectively formatted data bit streams through the TDM or cell format modules provides an effective technique for ensuring that TDM formatted data is not broken up into packets or cells, incurring additional overhead bits identifying the respective payloads as discussed in U.S. Patent application Ser. No. 09/688,804, incorporated by reference, above. Again, it is noted that the embodiment of FIG. 3 is used when more than one type of data format is used in the bidirectional WDM network. As in the previous embodiment, elements 410, 420, 430 and 440 can be eliminated when optical channels in the network are encoded with a single data format.

Electrical communication paths 411, 412, 421, and 422 allow data to be sent across the bridge from one bidirectional waveguide to another. The discontinuity schematically indicated in these paths indicates that other devices may be positioned between the modules, depending upon system implementation. For example, some of the data bit streams may be routed to a module for a different bidirectional waveguide; similarly, data bit streams may be accepted from other optical channels on other bidirectional waveguides at this point in the system. Alternatively, a series of line cards corresponding to each type of data format (e.g., IP, MPLS, ATM, GbE, etc.) can be interposed between the two modules 410, 430, 420, 440. Such cards are described in further detail in applicants' copending U.S. Patent application Ser. 09/688,804, incorporated by reference above.

In another alternate embodiment, a single cell format module and TDM format module may be provided between optical network interfaces 332 and 352 (or a pair of modules for each optical channel. Such modules would be configured to route traffic from one waveguide to the other or reciprocally from each waveguide to the opposite waveguide.

In order to facilitate protection switching in the event of equipment or transmission line failure (e.g., fiber cut), an electrical cross-connect may optionally be provided interconnecting the cell and TDM format modules of the work system with the optical network interface of the protect system and interconnecting the cell and TDM format modules of the protect system with the optical network interface of the work system. In this way, data can be efficiently routed to the surviving optical path to prevent service interruption. Other electrical cross-connect configurations, such as between optical network interfaces when cell and TDM format modules are omitted, may also be used to enable protection switching.

As discussed above in connection with FIG. 1, the same process for routing data bit streams may occur for one or more optical channels dropped from bidirectional waveguide 120 in the optical network of FIG. 3. In an exemplary embodiment, the same number of channels having the same wavelengths are add/dropped from each of the optical waveguides. Data bit streams from each of the channels that are dropped from each waveguide are encoded onto various optical channels being added to the other bidirectional waveguide. Alternatively, an unequal number of optical channels may be add/dropped onto each waveguide.

Various channel plans can be accommodated by the systems of the present invention. For example, the west-east WDM signal may be selected to include only optical channels within the C-band (nominally defined as wavelengths from approximately 1530–1565nm); conversely, the east-west WDM signal may be selected to include only optical channels within the L band (nominally defined as wavelengths from approximately 1565–1610 nm). For such a channel plan the optical add-drop multiplexer would drop add-drop two C, L channel pairs to/from each bidirectional waveguide. Such a channel plan simplifies optical amplifier selection since the amplifier chosen to amplify each signal band would be optimized to have a flat gain profile across that band.

Alternatively, the west-east channels may be selected from wavelengths across the entire wavelength spectrum to provide maximum interchannel spacing distance (and minimize potential cross talk. In such an embodiment, the east-west channel wavelengths would alternate with the west-east channel wavelengths in an interleaved manner (e.g., west-east channel wavelengths of 1528, 1532, 1536, 1540, etc. and east-west channel wavelengths of 1530, 1534, 1538, 1542, etc.). In either case, the west-east and east-west channels plans will likely be dictated by overall system considerations, such as the network topology in which the system is deployed. Further, because the west-east and east-west WDM optical signals may be routed along different paths within the add-drop multiplexers, it is possible that one or more of the optical channel wavelengths in each of the counter-propagating WDM signals may be the same.

While the above invention has been described with reference to the particular exemplary embodiments, many modifications and functionally equivalent elements may be substituted without departing from the spirit and contributions of the present invention. Accordingly, modifications and functionally equivalent elements such as those suggested above, but not limited thereto, are considered to be within the scope of the following claims.

What is claimed is:

1. A bidirectional optical network including a bridge for selectively transferring information from an optical channel carried on a first bidirectional wavelength division multiplexed optical waveguide to at least two optical channels on a second bidirectional wavelength division multiplexed optical waveguide comprising:

a first bidirectional optical waveguide carrying a first bidirectional wavelength division multiplexed optical communication signal, the first bidirectional wavelength division multiplexed optical communication signal comprising a first wavelength division multiplexed optical communication signal including a plurality of first optical channels propagating in a first direction and further comprising a second wavelength division multiplexed optical communication signal comprising a plurality of second optical channels propagating in a second direction;

a second bidirectional optical waveguide carrying a second bidirectional wavelength division multiplexed optical communication signal, the second bidirectional wavelength division multiplexed optical communication signal comprising a third wavelength division multiplexed optical communication signal including a plurality of third optical channels propagating in a third direction and further comprising a fourth wavelength division multiplexed optical communication signal comprising a plurality of fourth optical channels propagating in a fourth direction;

a bridge interposed between the first bidirectional optical waveguide and the second bidirectional optical waveguide, the bridge comprising:

a first optical add-drop multiplexer optically communicating with the first bidirectional optical waveguide for selecting at least a first optical channel from the first wavelength division multiplexed optical signal, the first optical channel including at least a first series of data bits and a second series of data bits encoded on the optical channel;

a first optical network interface optically communicating with the first optical add-drop multiplexer, the first optical network interface including optical to electrical conversion means for converting the selected first optical channel to a first electrical signal which includes the first series of data bits;

at least two electrical to optical conversion elements configured such that the first electrical signal encoded with the first series of data bits is used to modulate a second optical channel and the second electrical signal encoded with the second series of data bits is used to modulate a third optical channel;

one or more electrical communication paths for routing the first and second electrical signals to the electrical to optical conversion elements;

a second optical add-drop multiplexer optically communicating with the second bidirectional optical waveguide;

a second optical path between the second optical add-drop multiplexer and the second optical network interface for receiving the second and third optical channel and supplying them to the second optical add-drop multiplexer such that they and added to the second bidirectional optical waveguide.

2. An optical network as recited in claim 1 wherein the at least two electrical to optical conversion elements are part of the first optical network interface.

3. An optical network as recited in claim 1 wherein the at least two electrical to optical conversion elements are part of a second optical network interface which optically communicates with the second optical add-drop multiplexer.

4. An optical network as recited in claim 3 further comprising cell format modules and TDM format modules interposed between the first and second optical network interfaces.

5. A bidirectional optical network including a bridge for selectively transferring information from an optical channel carried on a first bidirectional wavelength division multiplexed optical waveguide to at least two optical channels on a second bidirectional wavelength division multiplexed optical waveguide comprising:

a first bidirectional optical waveguide carrying a first bidirectional wavelength division multiplexed optical communication signal, the first bidirectional wavelength division multiplexed optical communication signal comprising a first wavelength division multiplexed optical communication signal including a plurality of first optical channels propagating in a first direction and further comprising a second wavelength division multiplexed optical communication signal comprising a plurality of second optical channels propagating in a second direction;

a second bidirectional optical waveguide carrying a second bidirectional wavelength division multiplexed optical communication signal, the second bidirectional wavelength division multiplexed optical communication signal comprising a third wavelength division multiplexed optical communication signal including a plurality of third optical channels propagating in a third direction and further comprising a fourth wavelength division multiplexed optical communication signal comprising a plurality of fourth optical channels propagating in a fourth direction;

a bridge interposed between the first bidirectional optical waveguide and the second bidirectional optical waveguide, the bridge comprising:

a first optical add-drop multiplexer optically communicating with the first bidirectional optical waveguide for selecting at least a first optical channel from the first wavelength division multiplexed optical signal, the first optical channel including at least a first series of data bits and a second series of data bits encoded on the optical channel;

a first optical network interface optically communicating with the first optical add-drop multiplexer, the first optical network interface including an optical to electrical conversion element for converting the selected first optical channel to a first electrical signal which includes the first and second series of data bits;

means for separating the first series of data bits from the second series of data bits and encoding a second electrical signal with the first series of data bits and encoding a third electrical signal with the second series of data bits;

one or more electrical communication paths situated between the separating means and a second optical network interface such that the second electrical signal and the third electrical signal electrically communicate with the second optical network interface, the second optical network interface including at least two electrical to optical conversion elements such that the second electrical signal encoded with the first series of data bits is used to modulate a second optical channel and the third electrical signal encoded with the second series of data bits is used to modulate a third optical channel;

a second optical add-drop multiplexer optically communicating with the second bidirectional optical waveguide;

a second optical path between the second optical add-drop multiplexer and the second optical network interface for receiving the second and third optical channel and supplying them to the second optical add-drop multiplexer such that they and added to the second bidirectional optical waveguide.

6. An optical network as recited in claim 5 further comprising cell format modules and TDM format modules interposed between the first and second optical network interfaces.

7. A bidirectional optical network including a bridge for selectively transferring information from an optical channel carried on a first bidirectional wavelength division multiplexed optical waveguide to at least two optical channels on a second bidirectional wavelength division multiplexed optical waveguide comprising:

a first bidirectional optical waveguide carrying a first bidirectional wavelength division multiplexed optical communication signal, the first bidirectional wavelength division multiplexed optical communication signal comprising a first wavelength division multiplexed optical communication signal including a plurality of first optical channels propagating in a first direction and further comprising a second wavelength division multiplexed optical communication signal comprising a plurality of second optical channels propagating in a second direction;

a second bidirectional optical waveguide carrying a second bidirectional wavelength division multiplexed optical communication signal, the second bidirectional wavelength division multiplexed optical communication signal comprising a third wavelength division multiplexed optical communication signal including a plurality of third optical channels propagating in a third direction and further comprising a fourth wavelength division multiplexed optical communication signal comprising a plurality of fourth optical channels propagating in a fourth direction;

a bridge interposed between the first bidirectional optical waveguide and the second bidirectional optical waveguide, the bridge comprising:

a first optical add-drop multiplexer optically communicating with the first bidirectional optical waveguide for selecting at least a first optical channel from the first wavelength division multiplexed optical signal, the first optical channel including at least a first series of data bits and a second series of data bits encoded on the optical channel;

a first transponder interface optically communicating with the first optical add-drop multiplexer for receiving the first optical channel dropped from the add-drop multiplexer and producing a corresponding first short-reach optical signal to be output onto a first optical path from the transponder;

a first optical network interface optically communicating with the first optical path, the first optical network interface including an optical to electrical conversion element for converting the selected first optical channel to a first electrical signal which includes the first and second series of data bits;

means for separating the first series of data bits from the second series of data bits and encoding a second electrical signal with the first series of data bits and encoding a third electrical signal with the second series of data bits;

one or more electrical communication paths situated between the separating means and a second optical network interface such that the second electrical signal and the third electrical signal electrically communicate with the second optical network interface, the second optical network interface including at least two electrical to optical conversion elements such that the second electrical signal encoded with the first series of data bits is used to modulate a second short-reach optical signal and the third electrical signal encoded with the second series of data bits is used to modulate a third short-reach optical signal;

a second transponder interface optically communicating with the second optical network interface for receiving the second and third short-reach optical signals and converting them into second and third optical channels;

a second optical add-drop multiplexer optically communicating with the second bidirectional optical waveguide;

a second optical path between the second optical add-drop multiplexer and the second transponder interface for receiving the second and third optical channels and supplying them to the second optical add-drop multiplexer such that they and added to the second bidirectional optical waveguide.

8. An optical network as recited in claim 7 further comprising cell format modules and TDM format modules interposed between the first and second optical network interfaces.

* * * * *